(12) United States Patent
Krasowski et al.

(10) Patent No.: US 9,726,268 B1
(45) Date of Patent: Aug. 8, 2017

(54) MULTI-SPOKED WHEEL ASSEMBLY

(71) Applicant: The United States of America as represented by the Administrator of the National Aeronautics and Space Administration, Washington, DC (US)

(72) Inventors: Michael Krasowski, Chagrin Falls, OH (US); Lawrence Greer, Avon, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/095,442

(22) Filed: Dec. 3, 2013

Related U.S. Application Data

(60) Provisional application No. 61/797,742, filed on Dec. 7, 2012.

(51) Int. Cl.
*A61G 5/06* (2006.01)
*F16H 37/04* (2006.01)
*F16H 1/36* (2006.01)
*F16H 1/28* (2006.01)
*F16H 3/58* (2006.01)

(52) U.S. Cl.
CPC ............ *F16H 37/041* (2013.01); *A61G 5/06* (2013.01); *A61G 5/061* (2013.01); *F16H 1/36* (2013.01); *F16H 3/58* (2013.01); *F16H 2001/2881* (2013.01)

(58) Field of Classification Search
CPC ........ F16H 1/2845; F16H 1/2836; F16H 3/46; F16H 3/48

USPC ....... 475/334, 325, 311, 313, 337, 339, 319, 475/288, 346, 903

See application file for complete search history.

(56) References Cited

U.S. PATENT DOCUMENTS

| | | | | |
|---|---|---|---|---|
| 433,394 | A | * | 7/1890 | Belding .................... 475/325 |
| 525,479 | A | * | 9/1894 | Wolf ......................... 475/288 |
| 918,657 | A | * | 4/1909 | Coffee .................. F16H 3/663 475/277 |

(Continued)

OTHER PUBLICATIONS

Forsyth, Robert W., Forsyth, John P., title "Design and Development of the TerraStar Marginal-Terrain Amphibian"; Vehicle Group, Lockheed Aircraft Service Co., Div., Lockheed Aircraft Corp.; Society of Automorive Engineers; West Coast Meeting, Aug. 12-15, 1968, San Francisco, California; pp. 1-12; 680535.

(Continued)

*Primary Examiner* — Robert A Siconolfi
*Assistant Examiner* — Ryan Dodd
(74) *Attorney, Agent, or Firm* — Robert H. Earp, III

(57) ABSTRACT

A robust ground traction (drive) assembly for remotely controlled vehicles, which not only operates smoothly on surfaces that are flat, but also upon surfaces that include rugged terrain, snow, mud, and sand, is provided. The assembly includes a sun gear and a braking gear. The sun gear is configured to cause rotational force to be applied to second planetary gears through a coupling of first planetary gears. The braking gear is configured to cause the assembly (or the second planetary gears) to rotate around the braking gear when an obstacle or braking force is applied.

18 Claims, 3 Drawing Sheets

(56) References Cited

U.S. PATENT DOCUMENTS

| | | | | |
|---|---|---|---|---|
| 2,931,449 A * | 4/1960 | King | ............... | A61G 5/061 |
| | | | | 180/8.2 |
| 3,283,839 A * | 11/1966 | Brown | ............... | A61G 5/061 |
| | | | | 180/8.2 |
| 3,348,518 A * | 10/1967 | Forsyth | ............... | B60F 3/0007 |
| | | | | 180/6.2 |
| 3,580,344 A * | 5/1971 | Floyd | ............... | A61G 5/065 |
| | | | | 180/8.2 |
| 4,457,526 A * | 7/1984 | Persson | ............... | B62B 5/026 |
| | | | | 280/5.26 |
| 4,790,548 A * | 12/1988 | Decelles | ............... | A61G 5/061 |
| | | | | 180/6.5 |
| 6,484,829 B1 * | 11/2002 | Cox | ............... | A61G 5/061 |
| | | | | 180/8.1 |
| 7,249,640 B2 | 7/2007 | Horchler et al. | | |
| 8,393,420 B2 * | 3/2013 | Kim | ............... | B62B 5/026 |
| | | | | 180/8.2 |
| 8,967,736 B2 * | 3/2015 | Zakuskin | ............... | B62D 55/04 |
| | | | | 180/65.6 |

OTHER PUBLICATIONS

Tashjian, R. C., Simmons, J. A., U.S. Marine Corps; title "Marine Corps Marginal Terrain Vehicle XM 759"; Society of Automotive Engineers; International Automotive Engineering Congress, Detroit, Michigan; Jan. 13-17, 1969; pp. 1-12; 690190.

* cited by examiner

MULTI-SPOKED WHEEL ASSEMBLY

CROSS-REFERENCE TO RELATED APPLICATION

This application claims the benefit of U.S. Provisional Patent Application No. 61/797,742, filed on Dec. 7, 2012, the subject matter of which is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention relates to a spoked wheel assembly, and, more particular, to a spoked wheel assembly having two rotational modes of operation.

BACKGROUND

Track assemblies are complex, and operators generally complain about maintenance issues, as well as the tracks being dislodged or thrown during operation. Further, stair climbing requires a track leading end radius greater than tread height, or requires separate mechanisms. For example, to climb stairs, the surface of the landing preceding the stairs must afford sufficient traction to initiate climbing. Wet, or otherwise slippery, surfaces often thwart climbing.

Wheels are optimal on flat surfaces, and move well over depressions and obstacles, which are less than the radius of the wheel. Wheels have sufficient radius to climb expected and unexpected obstacles and stair heights. However, in surfaces that are loose or covered with snow, the wheels must provide sufficient contact to prevent sinking and must have treads of sufficient texture to maintenance traction. In practice, wheeled robots have not performed well when tested against obstacles such as stairs and rubble.

Whegs assemblies include whegs (wheels) plus leg combinations, which operate nominally as three spokes on a driven axel. On a flat surface, the assembly operates as if legs (i.e., the spokes) are articulating and walking across the surface. Upon reaching an obstacle, the spokes appear to climb up the obstacle as legs would. However, there is a compromise between traction and smoothness of operation. For example, an unwanted up and down, side-to-side jerky displacement can be experienced during locomotion. This jerky operation creates stress on payloads and disrupts video impacting navigation and surveillance.

Thus, a robust ground traction (drive) mechanism for remotely controlled vehicles, which not only operate smoothly on surfaces that are flat, but also upon surfaces that include rugged terrain, snow, mud, and sand, may be beneficial.

SUMMARY

Certain embodiments of the present invention may provide solutions to the problems and needs in the art that have not yet been fully identified, appreciated, or solved by conventional wheel assembly systems. For instance, one or more embodiments of the present invention pertain to a multi-wheeled, spoked drive assembly for robots, and other vehicles, capable of two rotational modes. For example, the assembly can operate smoothly on flat surfaces, i.e., mode 1, and can cooperate on rugged, slick, or muddy surfaces, i.e., mode 2. In one instance, if the surface is loose (e.g., traction is not good), a mechanism can be engaged to force the wheels to rotate about the central assembly. This mechanism may be engaged passively through operator command, or autonomously actuated using feedback from the assembly indicating slippage or approaching a stall state.

In one embodiment, an apparatus is provided. The apparatus includes a sun gear and a braking gear. The sun gear is configured to cause rotational force to be applied to second planetary gears through a coupling of first planetary gears. The braking gear is configured to cause the second planetary gears to rotate around the braking gear when an obstacle or braking force is applied.

In another embodiment, an apparatus is provided. The multi-spoke assembly includes a sun gear and a braking gear. The sun gear is configured to cause rotational force to be applied to second planetary gears via first planetary gears. The braking gear is configured to cause the second planetary gears to rotate around the braking gear when a rotational force of the braking gear is reduced or the braking gear is prevented move spinning.

In yet another embodiment, an apparatus is provided. The apparatus includes a motor driven sun gear and a braking gear. The motor driven sun gear is configured to cause rotational force to be applied to second planetary gears via first planetary gears, causing the apparatus to traverse across a surface. The free spinning braking gear is configured to cause the second planetary gears to rotate around the braking gear when the apparatus an obstacle or braking force is applied.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a multi-spoke driven assembly for robots (or vehicles). The multi-spoked assembly may be configured to include two rotational modes—minor mode and major mode. In the minor mode, the multi-spoked assembly allows for smooth operation on even surfaces. In the major mode, when an obstacle is encountered and traction is good, the multi-spoked assembly is configured to automatically rotate its entire spoked structure and attempt to climb the obstacle. In another embodiment, if the terrain is loose and traction is not good, a mechanism is engaged to force the wheels to rotate about the multi-spoked assembly. This mechanism may be engaged passively, through operator command, or autonomously actuated using feedback from the assembly identifying slippage or stall.

Figure 1:
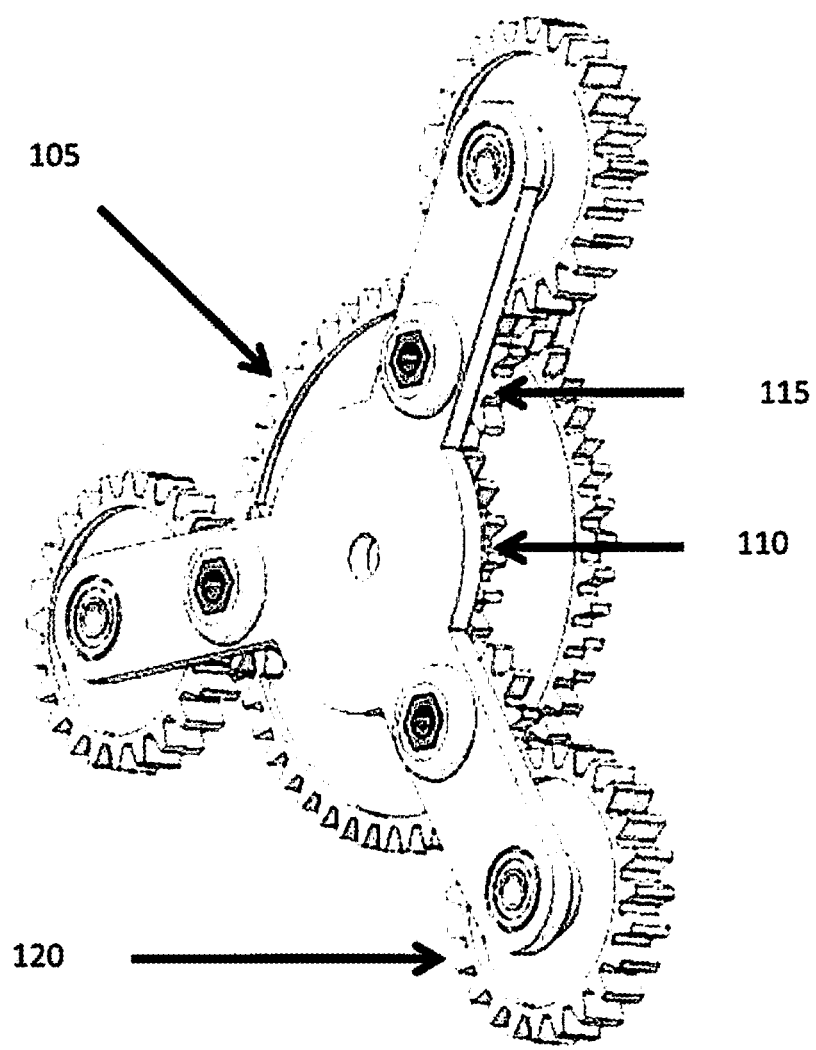
FIG. 1 is a schematic illustrating a three-wheel drive assembly, according to an embodiment of the present invention.

FIG. 1 is a schematic 100 illustrating a three-wheel drive assembly, according to an embodiment of the present invention. As shown in FIG. 3, a front plate 125 and a back plate 130 hold the internal components of the three-wheel assembly, i.e., braking gear 105, sun gear 110, first planetary gears 115, and second planetary gear 120 via locking mechanism 135. See also FIG. 2. In practice, front plate 125 is configured to face the wheels (not shown) and back plate 130 is configured to face the vehicle (also not shown).

The three-wheel drive assembly in this embodiment is a co-axial drive system including a braking gear 105 and a sun gear 110. For instance, sun gear 110 is situated near or at the center most axle, and braking gear 105 situated near or at the outer most axle. In this embodiment, braking gear 105 is free to spin and, in certain embodiments, may be held fast by a braking mechanism (not shown) causing the three-wheel assembly to rotate about the outer most axle axle. It should be appreciated that braking mechanism may be located in the vehicle and may be any type of mechanism configured to create a counter force against the coupled forces rotating braking gear 105 such as a caliper and disc, a drum, a band or a scrub brake or a motor using back electromotive force connections, or other methods. The braking mechanism is further configured to prevent braking gear 105 from spinning or reduce the rotational force of braking gear 105.

Sun gear 110 may be motor driven (see motor 121 in FIG. 3) in some embodiments allowing rotational force to be applied to second planetary (or wheel drive) gear 120 through coupling of first planetary gears 115. As shown in FIG. 3, wheels 123 are attached to second planetary gears 120, allowing the three-wheel drive assembly attached to a vehicle to traverse the surface.

It should be appreciated that the width of second planetary gears 120 is sufficiently wide to allow braking gear 105 and first planetary gears 110 to contact second planetary gears 120. In this embodiment, during operation, sun gear 110 and second planetary gears 120 rotate in a first direction, while braking gear 105 and first planetary gears 115 rotate in a second direction (or reverse direction). This allows the three-wheel drive assembly to traverse across a surface with at least one or two wheels contacting the surface at all times. When an obstacle is encountered and there is sufficient forward momentum, or when the braking mechanism applies brakes to braking gear 105 and the rotational force of braking gear 105 is stopped or reduced, second planetary gears 120 are configured to "walk" around braking gear 105. It should be noted that when braking gear 105 is held fast (or prevented from spinning), braking gear 105 does not rotate causing the second planetary gears 120 to rotate around braking gear 105.

It should be appreciated that the three-wheel drive assembly may operate in two modes—a minor mode and a major mode. In the minor mode, the three-wheel drive assembly allows for smooth operation on even surfaces. For example, two of the three wheels on the ground provide traction allowing the vehicle to traverse the surface. In the major mode, when the three-wheel drive assembly encounters an obstacle and sufficient friction is realized with the ground, the three-wheel drive assembly is configured to rotate allowing the three-wheel drive assembly to "walk" over the obstacle.

In certain embodiments of the major mode, braking gear 105 may be held fast in relation to the vehicle (by a braking mechanism) preventing braking gear 105 from spinning. Second planetary gears 120, which mesh with braking gear 105, are configured to drive around the circumference of braking gear 105, allowing the three-wheel assembly to rotate, or "walk", around an obstacle. It should be appreciated that complete braking need not be applied to braking gear 105, instead fractional (or modulated) braking on low friction surfaces can be sufficient to cause the three-wheel assembly to enter into the major mode allowing the three-wheel assembly to rotate.

Figure 2:
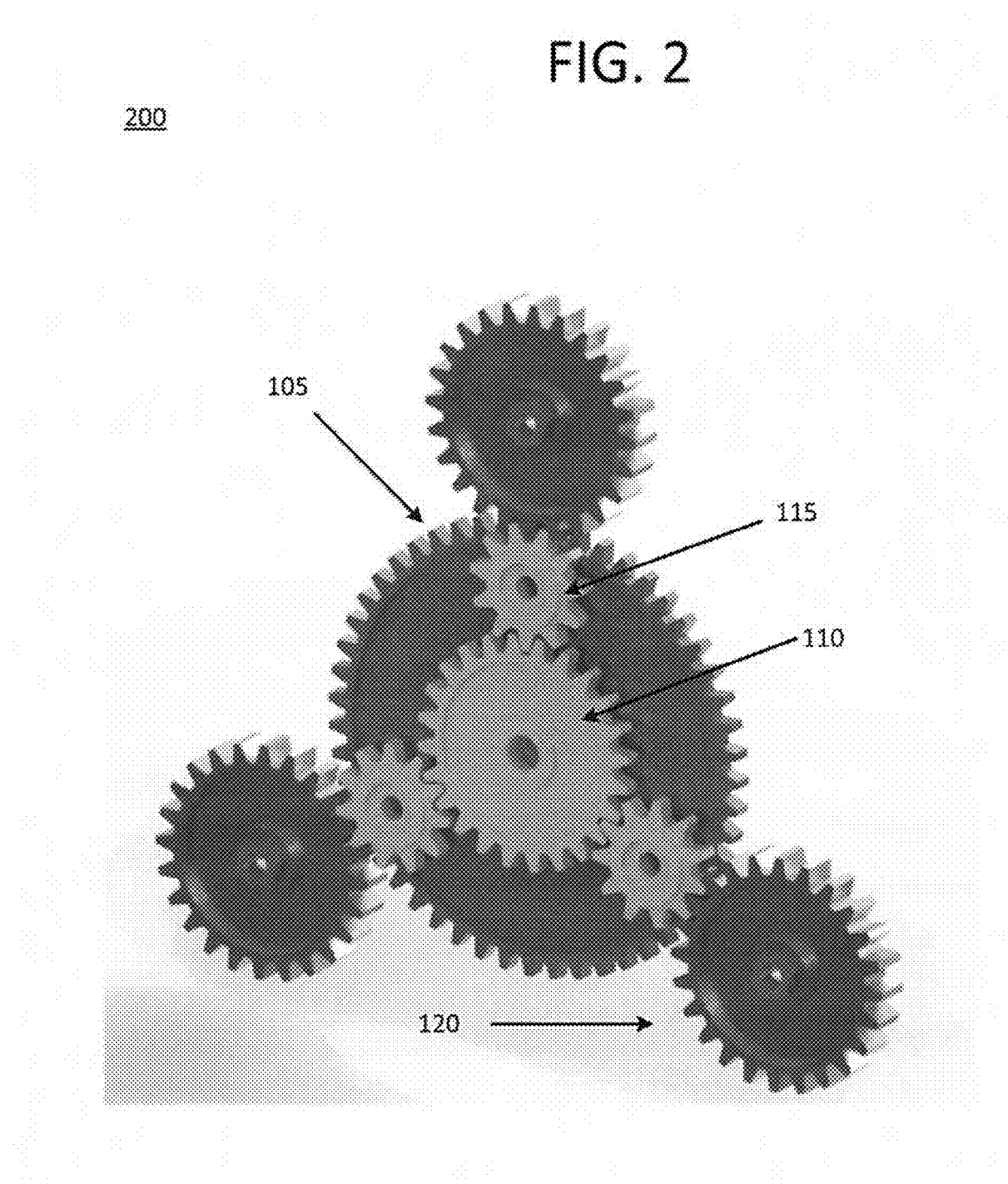
FIG. 2 is a schematic illustrating internal components of a three-wheel drive assembly, according to an embodiment of the present invention.
Figure 3:
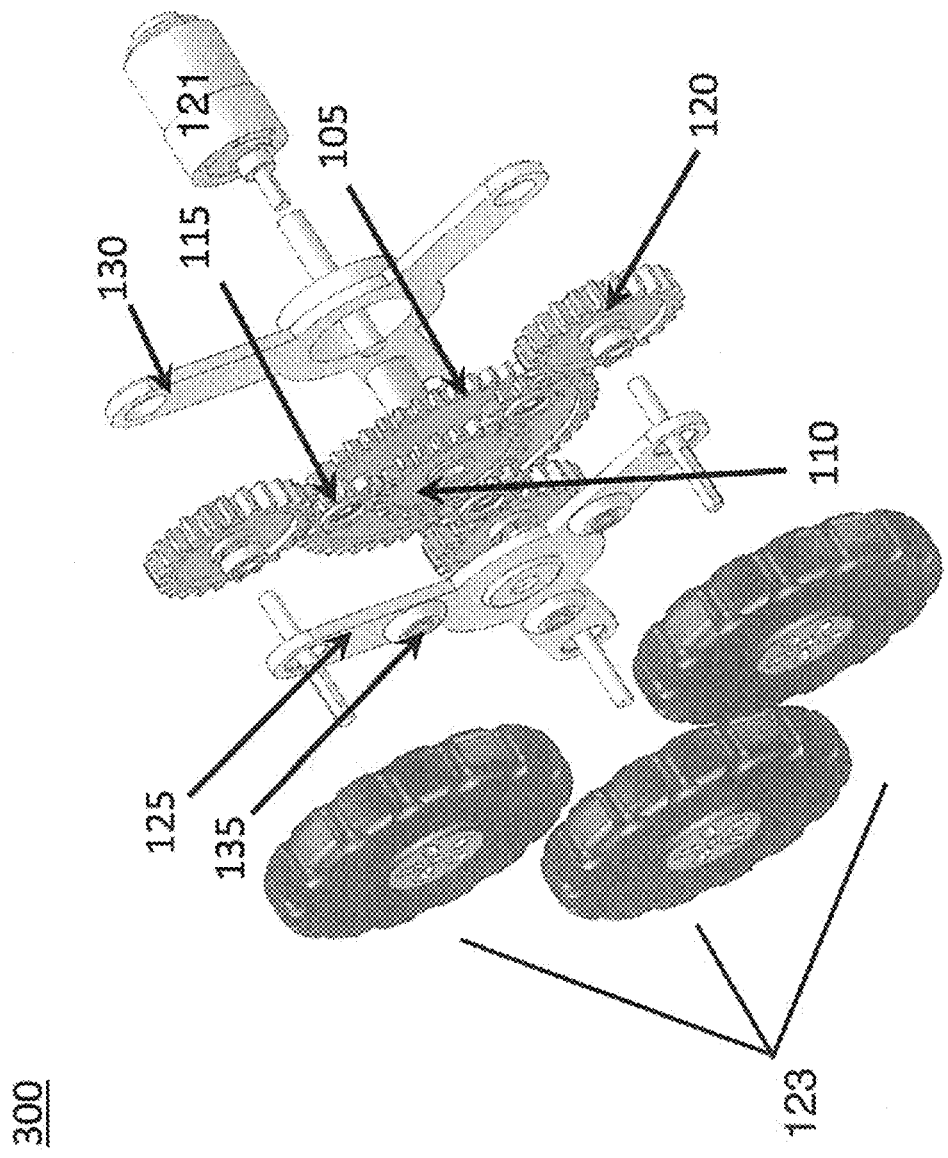
FIG. 3 is a schematic illustrating a three-wheel drive assembly, according to an embodiment of the present invention.

It should be appreciated that the assembly shown in FIGS. 1-3 are not limited to a three spoke or three-wheel drive assembly. The drive assembly may be designed to include any number of spokes, e.g., two, three, four, etc. The drive assembly is configured such that second planetary gears 120 are configured to rotate about the braking gear 105 when braking gear 105 is prevented from spinning or the rotational force of braking gear 105 is reduced. It should further be appreciated that the diameter of the gears may vary according to the desired optimization of the assembly.

It should also be appreciated that embodiments of the present inventions may be applied to robots for use by first responders (and others). For example, embodiments of the present invention may provide a multi-spoked wheel assembly that moves in a direction of optimizing a robot (or vehicle) for smooth operation on a flat surface, the ability to climb over obstacles including climbing of stairs, "walk" or move through loose surfaces, such as mud, snow, sand, etc. It should be appreciated that the spoked wheel drive assembly is robust, such that the assembly cannot come apart during normal operation of the vehicle, and may include a housing to contain and protect the gears and axels. The multi-spoked drive assembly may be further configured to switch between different modes of operation, i.e., passively, through user command, or autonomously.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a sun gear rotatable about a center axis;
   a plurality of first planetary gears in mesh engagement with the sun gear;
   a plurality of second planetary gears each in mesh engagement with a corresponding first planetary gear;
   a wheel connected to each of the plurality of second planetary gears to allow the apparatus to traverse on the wheels over the ground such that when one of the plurality of second planetary gears rotates about its axis of rotation its corresponding wheel rotates about the same axis of rotation;
   wherein rotational force applied to the sun gear causes rotational force on the second planetary gears through the mesh coupling of the first planetary gears; and
   a braking gear rotatable about the center axis and in mesh engagement with the plurality of second planetary gears;
   where the apparatus is configured to operate in two rotational modes of operation, comprising:
      a minor mode where each second planetary gear rotates about its respective axis and rotationally drives its corresponding wheel to allow the apparatus to roll on its wheels over a surface; or
      a major mode where each second planetary gear rotates about its respective axis and rotationally drives its corresponding wheel to roll over a surface as in the minor mode and also where each second planetary gear simultaneously travels rotationally around the braking gear thereby allowing the wheels to walk over a surface.

2. The apparatus of claim 1, wherein, during operation of the apparatus, the sun gear and the second planetary gears are configured to rotate in a first direction, and the braking gear and the first planetary gears are configured to rotate in a second direction.

3. The apparatus of claim 1, further comprising:
   a front plate and a back plate are configured to hold the sun gear, the first planetary gears, the second planetary gears, and the braking gear to form the apparatus.

4. The apparatus of claim 1, wherein the sun gear is configured to be operated by a motor.

5. The apparatus of claim 1, wherein the braking gear is configured to be operated by a braking mechanism.

6. A multi-spoked assembly, comprising:
   a sun gear rotatable about a center axis;
   a plurality of first planetary gears in mesh engagement with the sun gear;
   a plurality of second planetary gears each in mesh engagement with a corresponding first planetary gear;
   a wheel connected to each of the plurality of second planetary gears to allow the apparatus to traverse on the wheels over the ground such that when one of the plurality of second planetary gears rotates about its axis of rotation its corresponding wheel rotates about the same axis of rotation;
   wherein rotational force applied to the sun gear causes rotational force on the second planetary gears via the first planetary gears;
   a braking gear rotatable about the center axis and in mesh engagement with the plurality of second planetary gears;
   where the apparatus is configured to operate in two rotational modes of operation, comprising:
      a minor mode where each second planetary gear rotates about its respective axis and rotationally drives its corresponding wheel to allow the apparatus to roll on its wheels over a surface; or
      a major mode where each second planetary gear rotates about its respective axis and rotationally drives its corresponding wheel to roll over a surface as in the minor mode and also where each second planetary gear simultaneously travels rotationally around the braking gear thereby allowing the wheels to walk over a surface;
   wherein when a rotational force of the braking gear is reduced or the braking gear is prevented from moving or spinning, the plurality of second planetary gears travel around the braking gear.

7. The multi-spoked assembly of claim 6, wherein, during operation of the apparatus, the sun gear and the second planetary gears are configured to rotate in a first direction, and the braking gear and the first planetary gears are configured to rotate in a second direction.

8. The multi-spoked assembly of claim 6, further comprising:
   a front plate and a back plate are configured to hold the sun gear, the first planetary gears, the second planetary gears, and the braking gear to form the apparatus.

9. The multi-spoked assembly of claim 6, wherein the sun gear is configured to be operated by a motor.

10. The multi-spoked assembly of claim 6, wherein the braking gear is configured to be controlled by a braking mechanism.

11. An apparatus, comprising:
    a motor driven sun gear rotatable about a center axis;
    a plurality of first planetary gears in mesh engagement with the sun gear;
    a plurality of second planetary gears each in mesh engagement with a corresponding first planetary gear;
    a wheel connected to each of the plurality of second planetary gears to allow the apparatus to traverse on the wheels over the ground such that when one of the plurality of second planetary gears rotates about its axis of rotation its corresponding wheel rotates about the same axis of rotation,
    a braking gear rotatable about the center axis and in mesh engagement with the plurality of second planetary gears;
    where the apparatus is configured to operate in two rotational modes of operation, comprising: a minor mode wherein rotational force applied to the sun gear causes rotational force on the wheels, causing the apparatus to roll on its wheels to traverse across a surface; or a major mode where each wheel rotates about its respective axis as in the minor mode and also simultaneously travels rotationally around the braking gear thereby allowing the wheels to walk over surfaces.

12. The apparatus of claim 11, wherein, during operation of the apparatus, the sun gear and the second planetary gears are configured to rotate in a first direction, and the braking gear and the first planetary gears are configured to rotate in a second direction.

13. The apparatus of claim 11, further comprising:
a front plate and a back plate are configured to hold the sun gear, the first planetary gears, the second planetary gears, and the braking gear to form the apparatus.

14. The apparatus of claim 1, wherein the major mode is engaged through a braking force applied to the braking gear.

15. The apparatus of claim 1, wherein the major mode is engaged when the apparatus encounters an obstacle that retards the rotational force of any second planetary gear.

16. The apparatus of claim 1, wherein the major mode is engaged passively through operator command or autonomously actuated using feedback from the assembly indicating slippage or approaching a stall state.

17. The apparatus of claim 1, wherein the major mode is engaged when the terrain is loose and traction is not good.

18. The apparatus of claim 1, wherein the major mode is engaged through fractional or modulated braking.

\* \* \* \* \*